April 22, 1941.  R. J. WOODS ET AL  2,239,210
OPERATING MEANS FOR AIRPLANE CONTROL SURFACES
Original Filed April 5, 1938  2 Sheets-Sheet 1
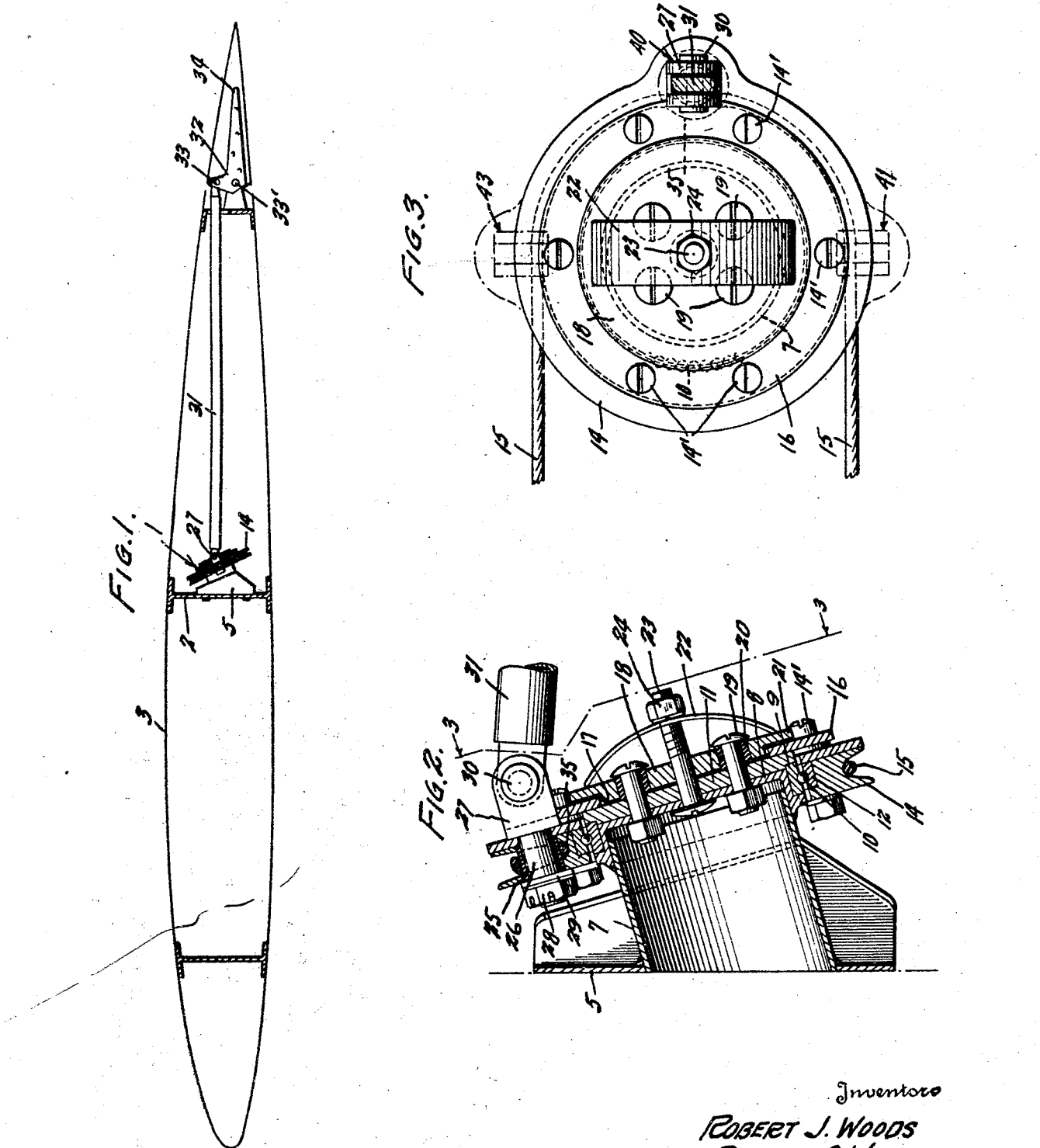
Inventors
ROBERT J. WOODS
AND ROBERT A. WOLF
By Semmes Keegin & Semmes
Attorneys

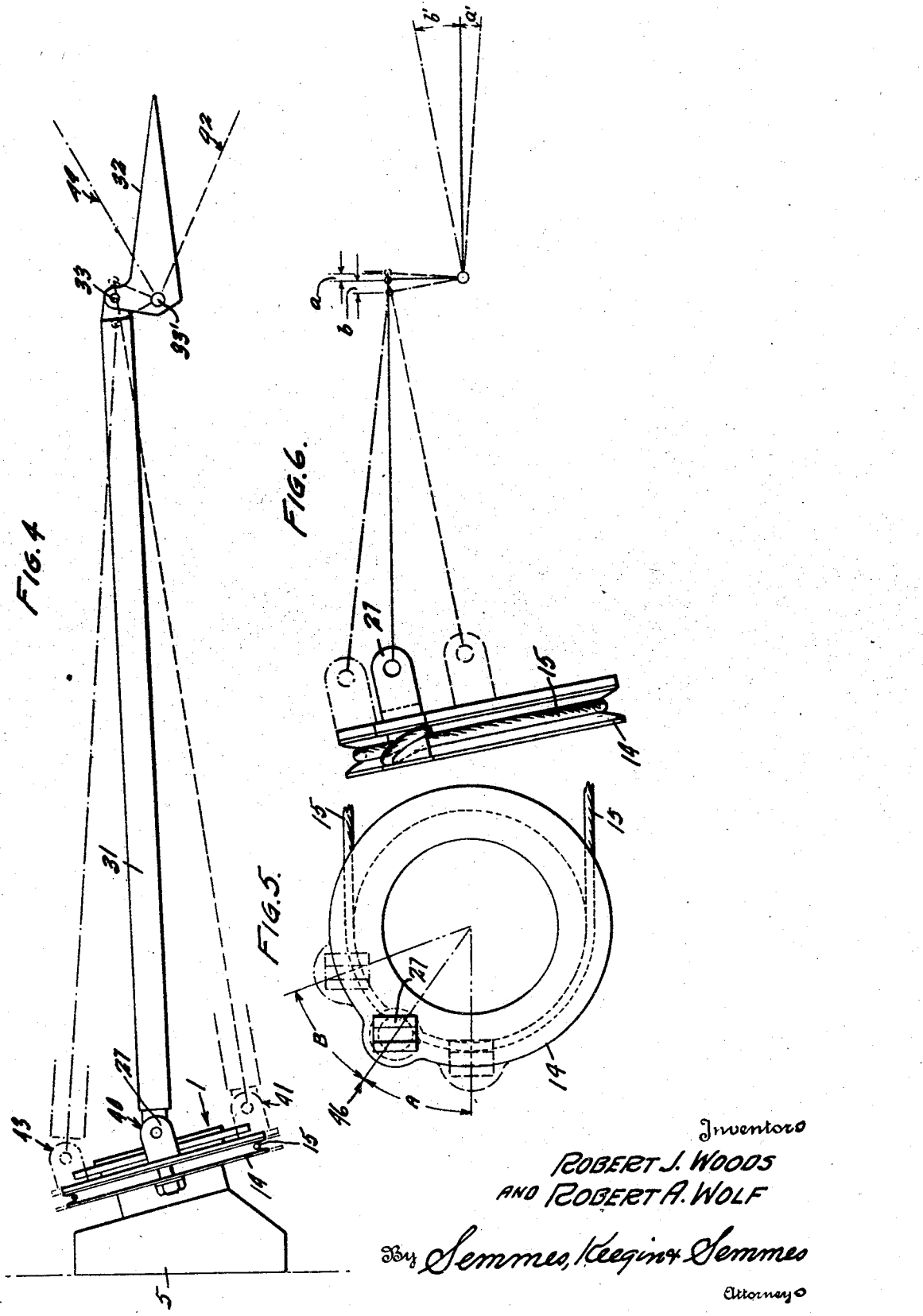

Patented Apr. 22, 1941

2,239,210

UNITED STATES PATENT OFFICE 2,239,210

OPERATING MEANS FOR AIRPLANE CONTROL SURFACES

Robert J. Woods, Grand Island, and Robert A. Wolf, Kenmore, N. Y., assignors to Bell Aircraft Corporation, Buffalo, N. Y., a corporation of New York Application April 5, 1938, Serial No. 200,236
Renewed March 27, 1940

12 Claims. (Cl. 244—90)

This invention relates to a means for operating an airplane control surface, and more particularly to an operating unit which is capable of incorporating variable conditions of semi-irreversibility and differential motion.

One of the objects of this invention is to provide a unit for operating an airplane control surface which is light and compact and yet is capable of absorbing major loads.

Another object of this invention is to provide a method of transforming rotary motion into linear motion in order to operate the control surface of an airplane.

Still another object of this invention is to provide a unit for operating an airplane control surface, the operation of which will impart a differential of motion to the means connecting the unit to said control surface.

Still another object of this invention is to provide a unit for operating an airplane control surface which in its irreversible and semi-irreversible phases is capable of absorbing shock loads and minimizing control surface flutter.

A further object of this invention is to provide a unit for operating an airplane control surface which is so constructed as to provide rotary motion and linear motion substantially normal to each other.

With these and other objects in view, our invention contemplates providing an operating unit to which rotary motion may be imparted by the movement of the control means of an airplane. Means connected with a control surface of the airplane are also provided which connect with the operating unit in such a manner that the rotary movement of this unit transmits to the connecting means a linear movement. This linear movement imparts an oscillatory movement to the said control surfaces of the airplane.

Adjustable means are also provided whereby forces acting upon the operating unit's rotary action may be varied so as to impart various degrees of irreversibility to the means connecting the operating unit with the plane control surfaces, and a differential motion may be given to said connecting means if desired. The angle which the rotary axis of the operating unit makes with the connecting means may also be varied in order to provide a wide range of movement of the control surfaces.

The operating unit is so constructed that, although forces are transmitted to the control surfaces by its use, this action is irreversible or semi-irreversible, and therefore forces acting upon the control surfaces cannot be transmitted by this device to the control means of an airplane.

In the drawings:

Figure 1 is a sectional view of an air foil showing the operation unit attached to one of the beams.

Figure 2 is a cross-sectional view of the operating unit.

Figure 3 is a view taken along line 3—3 of Figure 2 looking in the direction of the arrows.

Figure 4 is a side elevational view of the control unit diagrammatically showing its operation.

Figure 5 is a fragmental, elevational view showing diagrammatically the positions that give a differential movement to the control surface.

Figure 6 is a side elevational view of the positions shown in Figure 5.

As best shown in Figure 1, our invention consists of an operating unit, generally designated by the numeral 1, which is mounted in any suitable manner on a beam 2 of the air foil 3. This air foil 3 may be a wing, rudder, aileron, elevator, or any other surface to which a control surface can be attached.

As best shown in Figure 2, the operating unit 1 consists of a mounting bracket 5 rigidly attached to a beam 2 of the air foil 3 and which carries a boss 7 on the outer open end of which is rigidly mounted a flanged plate 8. The flanged plate 8 carries an inner ball race 9 of an anti-friction device 10 which is held in position by a retaining plate 11. The outer race 12 of the anti-friction device 10 is carried by a grooved movable pulley 14 which carries a cable 15.

Attached to the movable pulley 14 by means of bolts 14' is an annular disk 16. This disk 16 is provided with a central aperture 17 which is of less diameter than the inner periphery of the pulley 14. The disk 16 is adapted to bear against the retaining plate 11. A friction plate 18 is flexibly attached to the flanged member 8 by means of bolts 19 and flexible bushings 20. This friction plate is flanged, as at 21, this flanged portion being adapted to bear against the annular disk 16. A spring 22, mounted on a central bolt 23 and retained by a nut 24, is provided to give variable frictional contact between the stationary portion of the unit and the rotatable pulley.

The pulley 14 is provided with an opening 25 which carries a shank 26 of a bifurcated coupling 27 which is rotatably secured to the pulley 14 by means of the nut 28 and washers 29.

Attached to the bifurcated coupling 27 by any suitable means, as shown at 30, is a push tube 31. In place of the push tube 31 any other suitable connection may be used, such as a cable or a chain composed of several linkage mediums. The push tube 31 extends rearwardly along the air foil 3 and is attached to a hinge 32 by any suitable means, such as the bolt shown at 33. The hinge 32 is pivotally attached to the air foil 3 by any suitable means as shown at 33'. The hinge 32 may be attached to an aileron, elevator, trimming tab, or any other movable surface as shown at 34 in Figure 1.

In placing the cable 15 in operative position, it is first wrapped once around the shank 26 of the coupling 27 by passing it through a recess 35 in the pulley 14. The cable is then placed in the groove of the pulley 14 and its extremities are connected in any suitable manner with the control device of the plane.

From the above description it is believed obvious that any movement of the cable 15 will result in a rotary movement of the pulley 14 and corresponding rotary movement to the coupling 27. This rotary motion of the pulley 14 and the coupling 27 will result in a linear motion of the push tube 31 which will result in a rotary movement of the hinge 32 about its point of attachment 33.

The amount of linear movement transmitted to the push tube 31 will depend upon the relative angle of the pulley axis to the center line of the tube. The variations of this angle provides for a wide range of control from self-locking to complete reversibility. With a given load on the push-pull tube, the operating cable load is a primary function of this angle, small loads being functions of small angles.

In Figure 3 the pulley is shown at 40 in a neutral position. In this position the hinge 32 is in a horizontal position. If the pulley 14 is moved to the position shown at 41, the resulting upward movement of the bifurcated coupling 27 will produce an outward movement of the push tube 31 which will result in a lowering of the hinge 32 and therefore the attached control surface to the position shown at 42 in Figure 4. On the other hand if the pulley 14 is moved to the position 43, the push tube will be retracted resulting in an upward movement of the hinge 32 to the position 44 diagrammatically shown in Figure 4. By this method the movement of the pulley 14 through an arc of 90° results in a movement of the hinge through an angle in either an upwardly or downwardly direction. By providing an operating unit 1 with a spring 21 and a friction plate 18, various degrees of irreversibility may be used.

If desired, differential motion may be given to the push tube 31 by positioning the coupling 27 in an off-center neutral position, as shown at 46 in Figure 5. In this position motions in either direction through equal angles, such as the angles A and B shown in Figure 5, will produce unequal linear motions of the push tube 31, as shown diagrammatically at a and b in Figure 6. This unequal movement of the push tube 31 will result in a differential movement of the hinge 32. The movement of the coupling 27 through the angles A and B will therefore result in the movement of the hinge 32 which will result in the control surface forming a larger angle with its neutral position when fully raised than is possible when it is in its lowered position. This differential in angular movement is diagrammatically shown in angles a' and b'.

From the above description it is believed apparent that we have provided a means of operating an airplane control surface which may be used to produce differential motion, and which gives a wide latitude of operation between irreversible and reversible motion. In its irreversible and semi-irreversible phases, it is capable of absorbing shock loads and minimizing control surface flutter. It also has the advantage of providing cable motion and push-pull motion substantially normal to each other. This latter advantage is a highly desirable feature in most airplane design.

While for purposes of illustration we have described one manner by which the operating unit may be constructed, it is obvious that many changes could be made in the details of construction without departing from the spirit of the invention. We, therefore, desire that our invention be only limited by the prior art and the scope of the appended claims.

We claim:

1. A device for operating a control surface of an airplane comprising an operating unit capable of rotary movement, a control surface, and means connecting said control surface to said operating unit, said means having a line of thrust in angular relationship of less than 60 degrees with the rotation axis of the operating unit, whereby a rotary movement of the unit will impart a thrust to said connecting means, said unit and said connecting means being entirely without the slipstream.

2. A device for operating a control surface of an airplane comprising an operating unit consisting of a fixed member to which a pulley is attached in such a manner that it will rotate about the fixed member, and rigid means for connecting said pulley to the control surface of an airplane, said rigid means being connected to the pulley angularly at less than 60 degrees with respect to the rotation axis of said pulley, whereby a rotary movement of the pulley will cause a substantially longitudinal displacement of the said rigid connecting means.

3. A device for operating a control surface of an airplane comprising an operating unit consisting of a fixed member, a pulley movable on said fixed member, means to actuate the pulley, a friction plate carried by the fixed member to govern the movement of the pulley, a control surface for an airplane, and rigid means to connect said control surface to said pulley, said means having a line of thrust in angular relationship of less than 60 degrees with the rotation axis of the pulley, whereby the rotary movement of said pulley will impart a thrust to said rigid means.

4. A device for operating a control surface of an airplane comprising an operating unit consisting of a fixed member, a pulley movable on said fixed member, means to actuate the pulley, a spring actuated friction plate carried by the fixed member to govern the movement of the pulley, a control surface for an airplane, and rigid means to connect said control surface to said pulley, said means having a line of thrust in angular relationship of less than 60 degrees with the rotation axis of the pulley, whereby the rotary movement of said pulley will impart a thrust to said rigid means.

5. A device for operating a control surface of an airplane comprising an operating unit consisting of a fixed member, a pulley movable on said fixed member, means connected to the controlling mechanism of the airplane to actuate the pulley, a spring actuated friction plate carried by the fixed member to govern the movement of the pulley, a control surface for an airplane, and rigid means to connect said control surface to said pulley, said means having a line of thrust in angular relationship of less than 60 degrees with the rotation axis of the pulley, whereby the rotary movement of said pulley will impart a thrust to said rigid means.

6. A device for operating a control surface of an airplane comprising an operating unit consisting of a fixed member, a pulley movable on said fixed member, means connected to the controlling mechanism of the airplane to actuate the pulley, a spring actuated friction plate carried by the fixed member to govern the movement of the pulley, a control surface for an airplane, and rigid means to connect said control surface to said pulley in such a manner that the rotary movement of said pulley will impart a linear movement to said rigid means and thereby exert a force upon the control surface which results in a rotary movement.

7. A control surface operating mechanism for airplanes comprising a rotatable member, a thrust element rotatably and pivotally joined at one end to an eccentric portion of the rotatable member, the line of thrust of said thrust element bearing variable angular relationships with the axis of said rotatable member, some of said angular relationships being less than 60 degrees of arc, a hingeable member joined to the end of the thrust element away from said rotatable member, said hingeable member having an axis of hinging offset laterally from the thrust member, and a control surface carried by the hingeable member.

8. A control surface operating mechanism for airplanes comprising a wing, a rotatable member, the plane of rotation of said rotatable member being parallel to the wing axis, a thrust element rotatably and pivotally joined at one end to an eccentric portion of the rotatable member, said thrust element being disposed substantially parallel to the axis of flight, the center line of said thrust element bearing being capable of bearing variable angular relationships with the axis of said rotatable member, a hingeable member joined to the end of the thrust element away from said rotatable member, said hingeable member having an axis of hinging offset laterally from the thrust line of said thrust member, a control surface carried by the hingeable member, said rotatable member and said thrust member being entirely without the air stream.

9. A control surface operating mechanism for airplanes comprising a wing, a rotatable member, the plane of rotation of said rotatable member being parallel to the wing axis, means to rotate the rotatable member, a rotatable and pivotal link carried eccentrically by the rotatable member, a thrust element joined at one end to said link, said thrust element being disposed substantially parallel to the axis of flight, the center line of said thrust element bearing variable angular relationships with the axis of said rotatable member, some of said angular relationships being less than 60 degrees of arc, a hingeable member joined to the end of the thrust element away from said link, said hingeable member having an axis of hinging offset laterally from the thrust line of said thrust member, and a control surface carried by the hingeable member.

10. A control surface operating mechanism for airplanes comprising a rotatable member, means to operate the rotatable member, means to restrict the movements of the rotatable member to an angle of approximately 180 degrees of rotation, a thrust element rotatably and pivotally joined at one end to an eccentric portion of the rotatable member, the line of thrust of said thrust element bearing variable angular relationship with the axis of said rotatable member, a hingeable member joined to the end of the thrust element away from said rotatable member, said hingeable member having an axis of hinging offset laterally from the thrust line of said thrust member, and a control surface carried by the hingeable member.

11. A control surface operating mechanism for airplanes comprising a rotatable member, means to control the rotatable member, a thrust element rotatably and pivotally joined at one end to an eccentric portion of the rotatable member, the line of thrust of said thrust element varying with respect to the axis of the rotatable member as said rotatable member is rotated, a control surface member, means to operatively connect the thrust element to said control surface member in such a way that the rotatable member has two irreversible transmission positions corresponding to the extreme positions of the control surface member, whereby the degree of irreversible transmission through the rotatable member increases as the control surface increases its displacement from neutral position.

12. A control surface operating mechanism for airplanes comprising a rotatable member, means to control the rotatable member, a thrust element rotatably and pivotally joined at one end to an eccentric portion of the rotatable member, the line of thrust of said thrust element varying with respect to the axis of the rotatable member as said rotatable member is rotated, means to operatively connect the thrust element to said control surface member in such a way that the half extended position of the thrust member does not correspond with the neutral position of the control surface member, whereby the movement of the rotatable member through a given angle in one direction from its neutral position results in a greater displacement of said control surface than movement through the same angle in the opposite direction.

ROBERT J. WOODS.
ROBERT A. WOLF.

CERTIFICATE OF CORRECTION.

Patent No. 2,239,210.  April 22, 1941.

ROBERT J. WOODS, ET AL.

It is hereby certified that error appears in the printed specification of the above numbered patent requiring correction as follows: Page 3, first column, line 20, claim 6, strike out "in such a manner that" and insert instead the comma and words --, said means having a line of thrust in angular relationship with the axis of the pulley, whereby--; line 22, same claim, for "linear movement" read --thrust--; and that the said Letters Patent should be read with this correction therein that the same may conform to the record of the case in the Patent Office.

Signed and sealed this 12th day of August, A. D. 1941.

(Seal)

Henry Van Arsdale,
Acting Commissioner of Patents.